(12) United States Patent
Anderson

(10) Patent No.: US 9,457,954 B2
(45) Date of Patent: Oct. 4, 2016

(54) BREATHER SYSTEM AND METHOD

(75) Inventor: Steven Anderson, Rockwall, TX (US)

(73) Assignee: The Whitmore Manufacturing Company, Rockwall, TX (US)

(*) Notice: Subject to any disclaimer, the term of this patent is extended or adjusted under 35 U.S.C. 154(b) by 295 days.

(21) Appl. No.: 13/809,538

(22) PCT Filed: Jul. 20, 2011

(86) PCT No.: PCT/US2011/044635
§ 371 (c)(1),
(2), (4) Date: Jan. 10, 2013

(87) PCT Pub. No.: WO2012/012503
PCT Pub. Date: Jan. 26, 2012

(65) Prior Publication Data
US 2013/0112700 A1    May 9, 2013

Related U.S. Application Data

(60) Provisional application No. 61/399,950, filed on Jul. 20, 2010, provisional application No. 61/404,067, filed on Sep. 27, 2010, provisional application No. 61/461,921, filed on Jan. 25, 2011, provisional application No. 61/571,128, filed on Jun. 21, 2011.

(51) Int. Cl.
*B65D 6/40* (2006.01)
*B65D 90/34* (2006.01)
*B01D 53/26* (2006.01)

(52) U.S. Cl.
CPC .............. *B65D 90/34* (2013.01); *B01D 53/261* (2013.01); *B01D 2253/106* (2013.01); *B01D 2253/108* (2013.01); *B01D 2259/40003* (2013.01); *B01D 2279/35* (2013.01); *Y10T 29/49826* (2015.01)

(58) Field of Classification Search
CPC .............. B65D 90/34; B65D 2205/00; B01D 2279/35; B01D 2259/40003; B01D 2259/45
USPC .............. 220/745, 746, 747, 748, 749, 89.1, 220/2.02, 203.01, 203.27, 303, 367.1, 371; 53/263, 261
See application file for complete search history.

(56) References Cited

U.S. PATENT DOCUMENTS

| 91,092 A | * | 6/1869 | Cullmann | ............ C12H 1/0408 217/98 |
| 3,048,958 A | * | 8/1962 | Barnes | ............................ 96/136 |

(Continued)

*Primary Examiner* — Fenn Mathew
*Assistant Examiner* — Don M Anderson
(74) *Attorney, Agent, or Firm* — John Wilson Jones

(57) ABSTRACT

A breather device connects to a vessel. The breather device inlets air to the vessel and filters the air upon inlet via a filter media, and exhausts air from the vessel. The vessel has a pressure that may vary and a low pressure threshold and a high pressure threshold. The breather device includes a housing, a cartridge removable from the housing for containing the filter media, an inlet check valve to the housing, the inlet check valve is selectively biased to prevent flows therethrough unless the pressure in the vessel falls below the low pressure threshold, an outlet check valve from the housing, the outlet check valve is selectively biased to prevent exhaust therethrough unless the pressure in the vessel exceeds the high pressure threshold, and a pressure gauge connected to the housing for measuring internal pressure in the vessel. The breather device can additionally include seals and/or an internal check valve between the filter media and the vessel. The internal check valve, if present, prevents exhaust air of the vessel from contacting the filter media.

21 Claims, 5 Drawing Sheets

(56) References Cited

U.S. PATENT DOCUMENTS

| | | | | |
|---|---|---|---|---|
| 4,642,715 A | * | 2/1987 | Ende | G11B 33/1486 360/97.18 |
| 5,193,709 A | * | 3/1993 | Brassell | 220/371 |
| 5,358,009 A | * | 10/1994 | Cambell | B67D 7/002 137/209 |
| 5,535,740 A | | 7/1996 | Baghaee-Rezaee | |
| 6,562,106 B2 | * | 5/2003 | Campbell | 95/226 |
| 2006/0054404 A1 | | 3/2006 | El-Ibiary | |
| 2008/0197062 A1 | * | 8/2008 | Collins | B01D 63/02 210/136 |
| 2008/0216491 A1 | * | 9/2008 | Quest et al. | 62/77 |

\* cited by examiner

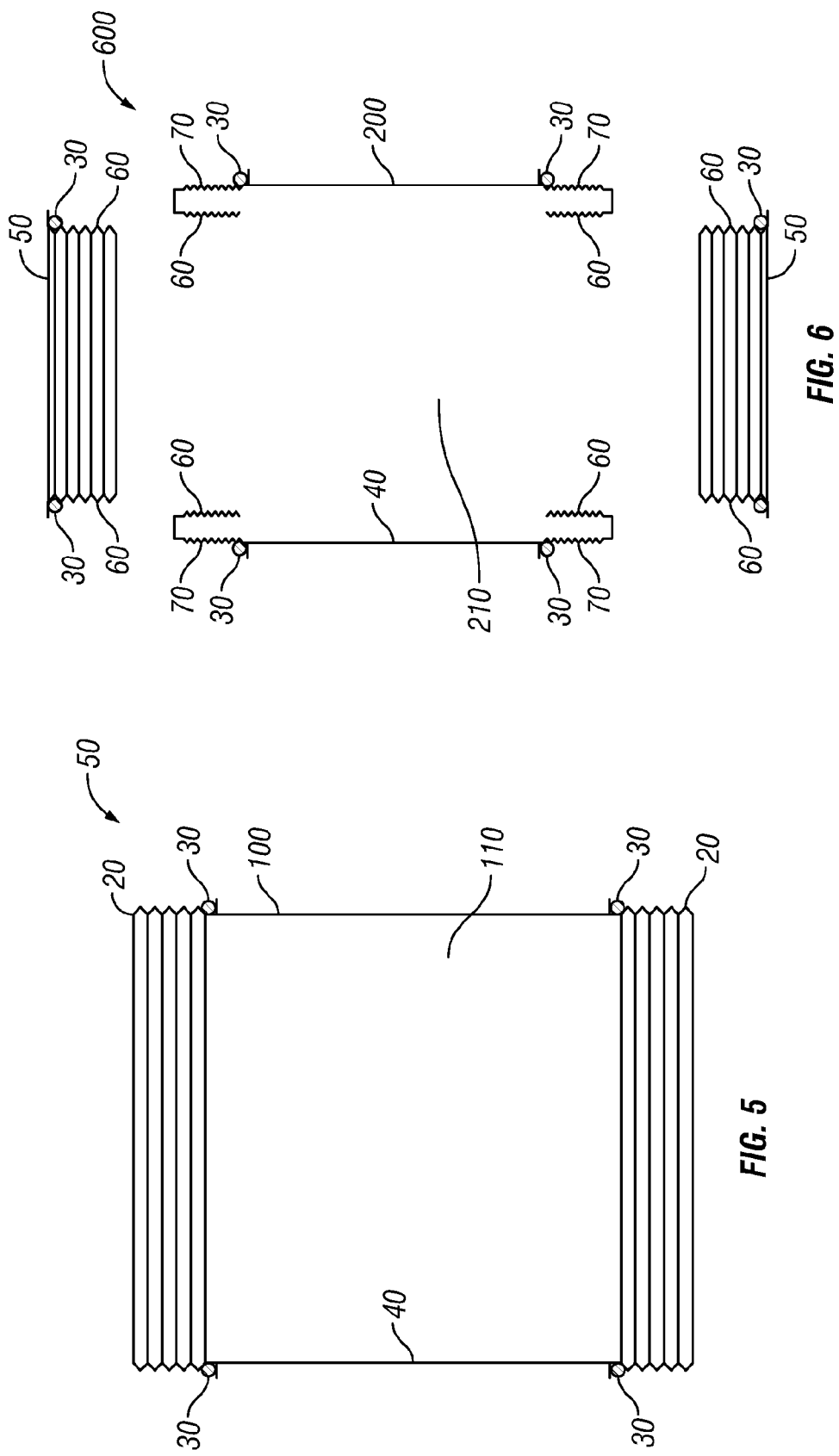

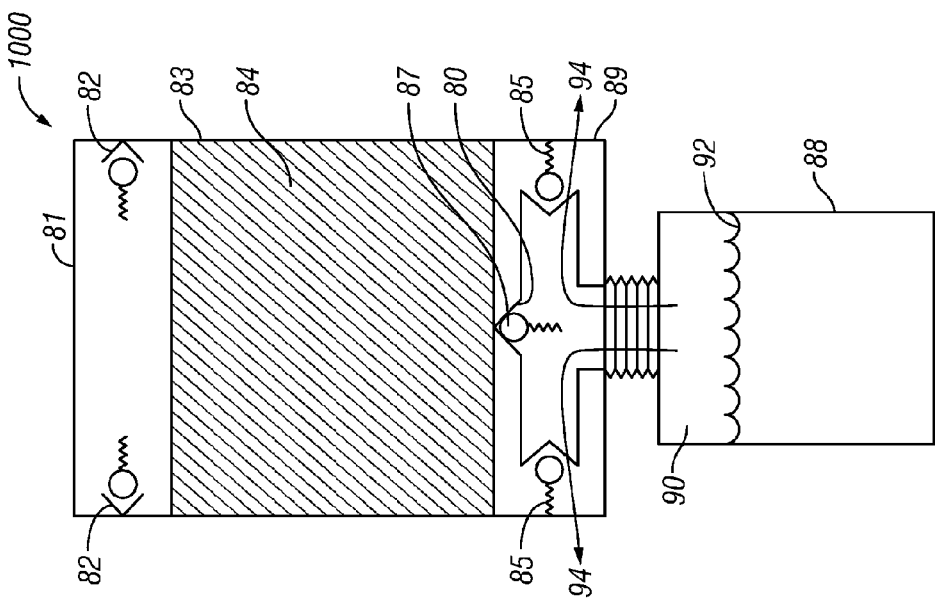
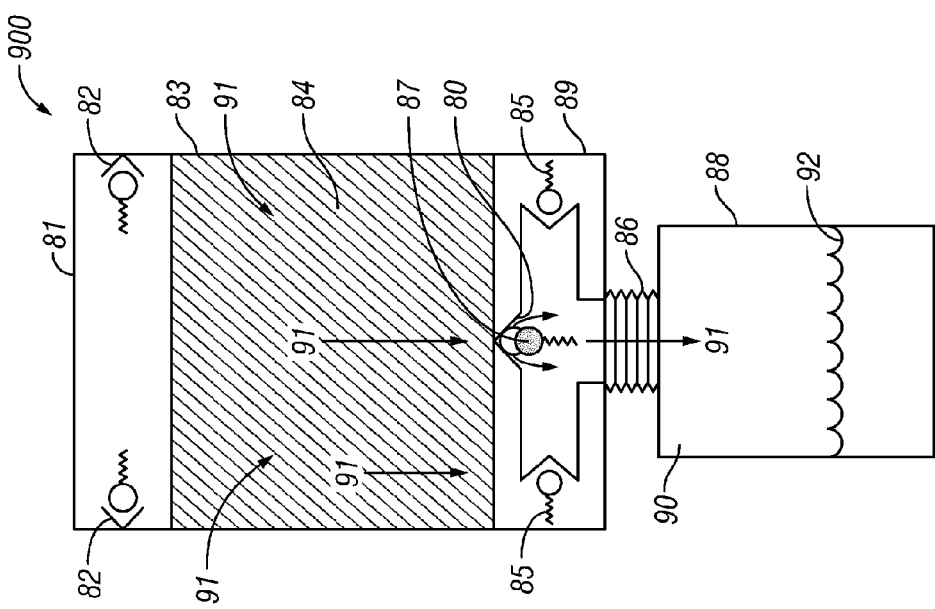
FIG. 10
FIG. 9

BREATHER SYSTEM AND METHOD

CROSS-REFERENCE TO RELATED APPLICATIONS

This application claims priority from (1) U.S. Provisional Patent Application Ser. No. 61/399,950, filed Jul. 20, 2010, by Steven Donald Anderson, and entitled "Modular Cartridge Filter"; (2) U.S. Provisional Patent Application Ser. No. 61/404,067, filed Sep. 27, 2010, by Steven D. Anderson, and entitled "Life Extension Check Valves"; (3) U.S. Provisional Patent Application Ser. No. 61/461,921, filed Jan. 24, 2011, by Steven Anderson, and entitled "Filter Breather Pressure Indicator"; and (4) U.S. Provisional Patent Application Ser. No. 61/571,128, filed Jun. 21, 2011, by Steven Donald Anderson, and entitled "Breather Life Extension Check Valves". The foregoing applications are each co-pending and each has at least one same inventor of the present application, and the present application is a conversion of and has benefit of priority of each of these applications. Each of these applications is hereby incorporated herein by this reference.

TECHNICAL FIELD

The invention generally relates to breather devices for allowing entry and escape of air or other gases to and from vessels during expansions and contractions of vessel contents and removing particulates and moisture of the gases, and more particularly relates to breather devices with, in alternative and combinations, check valves, pressure gauges, modular filter/dessicant units, and relief devices, providing improved operability, usability, life cycle, maintenance, safety, and economics.

BACKGROUND

A breather device (or "breather") connects to or is formed with a container to remove particulates and, if incorporated with a desiccant, moisture from air, before the air comes into contact with contents of the container. The container contents may be, for example, liquids or other contents, such as oils, foods, greases, paints, drinks, fuels, glues, acids or others. The container contents may alternately be dry goods or product, for example, powders, cements, flour, sugar, particulate chemicals, papers, circuit boards, electrical enclosures, transformers, or other dry chemicals, substances or equipment. In short, breathers are used on basically any container where moisture or particles are undesired contaminants. Breathers are necessary because tanks, reservoirs, containers and other vessels must have openings to allow air (or other gases of the like) to flow into and out of the container, as volume of the contents of the tank or vessel change.

Accordingly, breathers allow air (or other gases) to enter a reservoir (or vessel) and to exit the reservoir, thus preventing the reservoir (or vessel) from expanding and contracting, which could result in an over- or under-pressure condition harming the vessel or its contents, destruct the structural integrity of the vessel, or otherwise adversely or undesirably affect vessels, contents, or other effects. For example, in a hydraulic reservoir, such as a tank containing oil or other fluids, the fluid level in the hydraulic reservoir will vary greatly over time. The level may substantially continuously change over periods, for example, in view of the area, usage (fill and drain, as well as other aspects), number of cylinders, temperatures, pressures, and similar parameters and conditions, and such change can cause the hydraulic fluid level to fluctuate. Each time the hydraulic fluid level drops, air must enter the reservoir (to prevent a vacuum pressure condition). That air enters through a breather, which is installed to filter the air before it enters the hydraulic reservoir.

If the hydraulic fluid (e.g., oil) level is increased, air must exit the reservoir to prevent over-pressurization. That exhaust air normally exits through the same breather which was primarily installed to filter the air entering the reservoir (i.e., to prevent particulates and moisture from entry). This bi-directional flow of air through a breather is typical of most industrial breathers in use in the past. Air passes through the breather, in both directions (i.e., at certain times, from external, into and through the breather, to internal; and at certain other times, from internal, into and through the breather, to external), to allow for expansion and contraction of fluid or other product levels of the reservoir.

In order to prevent particulates and moisture from entry and exit, breathers typically include filters. Filters of breathers can be made of a large variety of materials or substances, for example, metal, plastic, wood, glass, clay, paper and others. The particular materials of construction of breather filters often depend upon the type of contaminant that must be trapped and its physical state (e.g., solid vs. liquid), the vessel liquids or other contents for protection from contamination, environmental conditions, temperature, flow rate, and other considerations. Likewise, the materials of construction of the particular filter medium, itself, can also vary widely. For example, filter medium, depending on application, can be paper, synthetic materials, activated carbon, silica gel, absorbent papers, wire mesh, molecular sieve, magnets, electro-mechanical or mechanical means, combinations, and/or others.

In operation of a breather that provides a dessicant, this desiccant breather being an example of one type of breather device, ambient air is directed through the desiccant breather when entering a vessel. As the ambient air passes through the breather, the ambient air comes into direct contact with the filter of the breather and any other moisture removal means thereof. Some breathers have an air diffuser (e.g., a sponge-like device that spreads the air flow). One type of dessicant employed in breathers as filter medium is silica gels. Certain of these silica gels used for breathers have included indicating dyes. When the silica can no longer adsorb any additional moisture, the dyes cause the silica to appear changed in color. The change in color indicates that the entire breather device must be replaced, to ensure moisture removal.

Conventional breathers are usable only once and then disposed. In particular, when the breather life span or cycle ends (e.g., the filter media clogs or is spent), the entire breather must be replaced. Breathers have not been serviceable, reactivatable, rechargeable or otherwise repaired, save full replacement. However, the breather, itself, is not necessarily antiquated or damaged at the end of life when it must be replaced. The conventional breathers, therefore, waste time, labor, materials and expense.

Referring to FIG. 1, a conventional breather device 1, for example, a silica gel type breather such as is similar to the Air Sentry® D-Series™ line of breather devices, includes a top cap 2 and a filter holder 3. The filter holder 3, for example, is a middle section of the breather 1. The filter holder 3 stores or retains a filter media 8 (e.g., silica gel in the example of the Air Sentry D line of breathers). The breather 1 also includes a bottom cap 4 which is coupled to or integral with a port 5. The port 5 connects the breather 1 to a container 9, for example, the port 5 mates with an opening 6 of the container 9. In the breather 1, both incoming and outgoing air (or other gas) from the container 9 must pass through the breather 1 and into and out of the container 9 via the opening 6. Entering gas to the container 9 flows through the breather 1, to the port 5, and into the opening 6 to the container 9, and exiting gas from the container 9 flows through the opening 6 of the container 9, to the port 5, and through the breather 1 to an outlet vent (a "gap", as later described).

Thus, when an air space 11 in the container 9 increases because less fluid 10 resides in the container 9 (or other change in condition of liquid and/or gas contents of the container 9 increases the air space 11), air (or other gas) 7 must enter the container 9 via the breather 1, to fill the air space 11. In the breather 1, as an example, air 7 enters the breather 1 via a gap (not expressly shown) between the top cap 2 and the filter holder 3 of the breather 1. The air 7 passes through an air diffuser (not shown in FIG. 1), which is, for example, a sponge like device as previously mentioned, and the air diffuser spreads the air 7 flow through the filter media 8 (i.e., silica gel as example). The air 7 from the filter media 8 passes to the port 5 and through the opening 6 to the container 9 to fill the air space 11.

On the other hand, when the air space 11 within the container 9 is reduced as the amount of fluid 10 in the container 9 increases (or as other change in condition causes reduction of the air space 11), air (or other gas) 7 from within the container 9 must exit the container 9. The air 7 in the air space 11 exits the container 9 by passing through the opening 6, and entering the breather 1 through port 5 of the breather 1. As can be understood, this exiting air 7 must pass back through the silica gel 8 of the breather 1, and then ultimately exit the breather 1 via the same gap between the top cap 2 and the filter holder 3. Because the gap allows both entry and exit for the breather 1 and container 9, ambient air can freely come into contact with the silica gel 8 of the breather 1 whether or not the air space 11 changes, and air of the air space 11 of the container 9 remains in steady contact with the silica gel 8 (i.e., whether or not air is actively entering or exiting the container 9) and passes through the silica gel 8 when entering or escaping the container 9.

As the air contacts the silica gel 8 of the breather 1, and also as the air passes, entering and exiting in both directions, through the silica gel 8, the life of the silica gel 8 is continuously reduced. To extend the life of silica gel 8, (or any other filter media) it may be desirable to have the inlet and exit ambient air to bypass silica gel 8. Although silica gel is specifically described for purposes of example, it should be understood that any and all types of the filter media 8 will tend to have reduced life span because of the continuous contact of ambient air and/or air in the air space 11 with the filter media 9, as well as the dual directional flows of air entering and exiting the container 9.

Thus, breathers have generally had limited life span for effective operation. The live span (or life cycle or cycle) of a breather is important because this impacts a number of operating and financial metrics. Certain of these metrics include that longer breather life improves return on investment in the breather; lessens labor time and effort required for servicing the breather; reduces and avoids costs otherwise required for replacements and inventories; improves effectiveness of the breather and limits contamination of vessel contents (e.g., there is less chance for maintenance issues with longer cycles between swapping out breathers); and lessens waste that results because conventional breathers must be wholly replaced when filter media is spent.

It would therefore be desirable to provide new and improved breather systems and methods for intake and exhaust of air and other gases from vessels and containers. It would also be desirable to improve life cycle longevity of breathers, filters and filter media. It would further be desirable to provide more usable, safe, and convenient breather systems, methods and operations, to reduce labor and servicing required, increase contaminant removal and overall effectiveness, reduce waste, increase economic results, improve performance, and provide other advantages.

SUMMARY OF THE INVENTION

An embodiment of the invention is a breather device for connection to a vessel. The breather device inlets air to the vessel when connected and filters the air by a filter media upon inlet, and outlets air from the vessel. The vessel has a pressure that may vary and a low pressure threshold and a high pressure threshold. The breather device includes a housing, a cartridge removably connected to the housing for containing the filter media, an inlet check valve connected to the housing, the inlet check valve is selectively biased to prevent flows therethrough unless the pressure in the vessel falls below the low pressure threshold, an outlet check valve connected to the housing, the outlet check valve is selectively biased to prevent exhaust therethrough unless the pressure in the vessel exceeds the high pressure threshold, and a pressure gauge connected to the housing for measuring internal pressure in the vessel.

Another embodiment of the invention is a breather device for connection to a vessel containing a content. The breather device inlets air to the vessel when connected. The vessel has a pressure that may vary and the content, the vessel, or both have a low pressure threshold. The breather device includes a housing, a filter medium contained in the housing, and an inlet check valve connected to the housing, the inlet check valve is selectively biased to prevent flows therethrough unless the pressure in the vessel falls below the low pressure threshold.

Another embodiment of the invention is a breather device for connection to a vessel containing a content. The breather device exhausts air from the vessel when connected. The vessel has a pressure that may vary and the content, the vessel, or both have a high pressure threshold. The breather device includes a housing, a filter medium contained in the housing, and an outlet check valve connected to the housing, the outlet check valve is selectively biased to prevent exhaust therethrough unless the pressure in the vessel exceeds the high pressure threshold.

Yet another embodiment of the invention is a method of manufacture of a breather device for connection to a vessel. The method includes providing a housing, placing a filter media in the housing, forming an inlet to the housing with an inlet check valve selectively biased to prevent flows therethrough unless a pressure in the vessel falls below a low pressure threshold, and forming and forming an outlet to the housing with an outlet check valve selectively biased to prevent flows therethrough unless a pressure in the vessel exceeds a high pressure threshold.

Another embodiment of the invention is a breather device for connection to a vessel. The vessel has varied internal pressure. Inlet and outlet flows to and from the vessel pass via the breather device when connected to the vessel. The breather device includes a housing, a filter medium contained in the housing, and a pressure gauge connected to the housing for measuring internal pressure in the vessel.

Yet another embodiment of the invention is a breather device for connection to a vessel. The breather device is for inlet of air to the vessel and filtering of the air by a filter media when connected to the vessel. The breather device includes a housing and a cartridge removably connected to the housing for containing the filter media. Once the cartridge is spent, the cartridge is replaceable and the housing is reusable.

Another embodiment of the invention is a breather device connected to a vessel. The breather device for outlet of air from the vessel, the vessel has a pressure that may vary and a high pressure threshold. The breather device includes a housing and a cartridge removably connected to the housing for containing the filter media.

Yet another embodiment of the invention is a method of manufacture of a breather device for connection to a vessel. The breather device inlets air to the vessel and filters the air by a filter media upon inlet, and outlets air from the vessel when connected. The method includes providing a housing, removably connecting a cartridge to the housing for the filter media, and connecting a pressure gauge to the housing for measuring internal pressure in the vessel. Once the cartridge is spent, the cartridge is replaceable and the housing is reusable.

Another embodiment of the invention is a breather device for connection to a vessel. The breather device is for inlet of air to the vessel and filtering of the air by a filter media upon inlet, and for outlet of air from the vessel. The vessel has a pressure that may vary and a low pressure threshold and a high pressure threshold. The breather device includes a housing containing the filter media, an inlet check valve connected to the housing, the inlet check valve is selectively biased to prevent flows therethrough unless the pressure in the vessel falls below the low pressure threshold, an outlet check valve connected to the housing, the outlet check valve is selectively biased to prevent exhaust therethrough unless the pressure in the vessel exceeds the high pressure threshold, and an intermediary check valve connected to the housing, adjacent the filter media and between the housing and the vessel, the intermediary check valve is selectively biased to prevent exhaust from the vessel contacting the filter media but to allow flows therethrough to the vessel from the filter media.

Yet another embodiment of the invention is a method of manufacture of a breather device for connection to a vessel. The breather device inlets air to the vessel and filters the air by a filter media upon inlet, and outlets air from the vessel when connected. The method includes providing a housing, removably connecting a cartridge to the housing for the filter media, connecting an inlet check valve to the housing, selectively biased to prevent flows therethrough unless the pressure in the vessel falls below the low pressure threshold, connecting an outlet check valve to the housing, selectively biased to prevent exhaust therethrough unless the pressure in the vessel exceeds the high pressure threshold, and connecting a pressure gauge to the housing for measuring internal pressure in the vessel.

Other embodiments of the invention include breather devices manufactured by any of the foregoing methods of manufacture.

BRIEF DESCRIPTION OF THE DRAWINGS

The present invention is illustrated by way of example and not limitation in the accompanying figures, in which like references indicate similar elements, and in which:

FIG. 5 illustrates a frontal side view of a modular cartridge filter, according to certain embodiments of the invention;

FIG. 6 illustrates a frontal side view, in vertical cross-section, of a disassembled modular cartridge filter, according to certain embodiments of the invention;

FIG. 9 illustrates a frontal side view of a breather, such as that of FIG. 8, having inlet, outlet and intermediary check valves, connected to a vessel containing a content, and illustrating inlet air flows, according to certain embodiments of the invention; and FIG. 10 illustrates a frontal side view of a breather, such as that of FIGS. 8 and 9, having inlet, outlet and intermediary check valves, connected to a vessel containing a content, and illustrating outlet air flows, according to certain embodiments of the invention.

DETAILED DESCRIPTION

For purposes of the following disclosure, the term "breather" means a breather device for connection to a tank, container, reservoir or other vessel allowing entry and/or exit of air or other gas to and from the vessel; and the term "air" means and is employed to refer broadly to air, other gas or gases, particulates, moisture and other contaminants therein, and any other entering or escaping gas, plasma, smoke, or vapor, or similar state of a composition or compositions, entering or exiting a container, tank, reservoir or vessel due to conditions of contents, the container, temperatures, pressures, environment, and other physical parameters.

Figure 2:
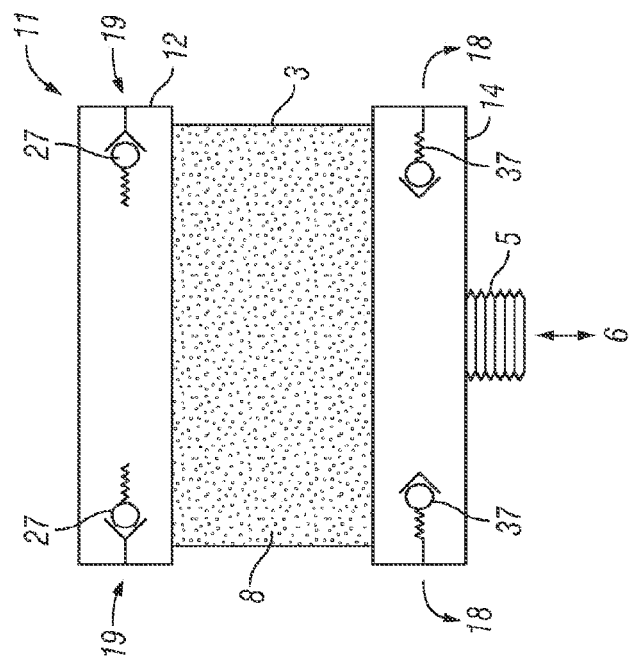
FIG. 2 illustrates a frontal side view of a breather having inlet and outlet check valves, according to certain embodiments of the invention.
Figure 1:
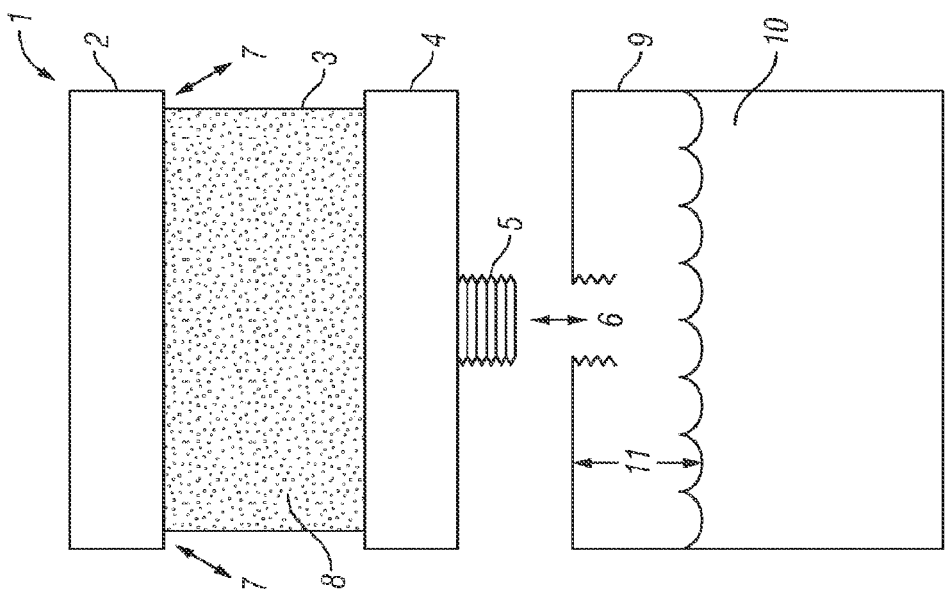
FIG. 1 illustrates a frontal side view of a conventional silica dessicant breather for connection to a vessel containing a liquid.

Referring to FIG. 2, a breather 11 (shown without container 9) according to certain embodiments includes a filter holder 3 and a filter media, for example, a silica gel 8 or other media, contained in the filter holder 3. By way of comparison of the breather 11 of such embodiments to the conventional breather device 1 of FIG. 1, the breather 11 allows inlet and exiting air (or other gas) to and from a vessel, for example, such as the container 9, to selectively bypass the silica gel 8 (or other media). The breather 11 includes a top cap 12 and a bottom cap 14, each connected to the filter holder 3. The top cap 12 does not have a gap (as with the conventional breather 1 of FIG. 1) formed between the top cap 12 and the filter holder 3.

The top cap 12 and the bottom cap 12 are each formed or incorporated with, or connected to, one or more one way check valves, for example, check valves 27 of the top cap 12 and check valves 37 of the bottom cap 12. The check valves 27 of the top cap 12 are designed to prevent air (or other gas) from exiting through the top cap 12 but to allow such air (or gas) to enter through the top cap 12. In other words, the check valves 27 only allow inlet air 19 to enter breather 11 when a vacuum state in the breather 11 overcomes a spring or operational pressure in the check valve 27, and the check valves 27 do not allow air within the breather 11 (i.e., and any connected container) to pass from the breather 11 (and container, as applicable) through the check valves 27, unless demand for that air movement is significant enough to overcome spring or other biasing pressure of the check valves 27.

In certain embodiments, the check valves 27 release air of very low pressure, for example, on the order of about 0.1 psi. However, the check valves 27 may be varied, according to desired design and application, to provide air release at any other applicable pressure in view of container contents, critical parameters and the like. As with the example release pressure of 0.1 psi, the low cracking pressure range is typically small enough in breathers and containers so as not to cause any cavitations. The check valves 27, thus, keep the silica gel 8 isolated from the ambient air 19 (external to the breather 11) when there is no need for air to prevent a lowered pressure vacuum-like condition in a container equipped with the breather 11.

Still referring to FIG. 2, the bottom cap 14 includes or connects to the check valves 37. The check valves 37 of the bottom cap 14 are designed to prevent air (or other gas) from entering through the bottom cap 14 from external to the breather 11, and thus bypassing the silica gel 8 as air enters the breather 11 (i.e., so that air enters, instead, through only the check valves 27, and air exits through only the check valves 37). The check valves 37 are also designed to prevent air from any attached container from entering the filter holder 3 and contacting the silica gel 8 or other filter media. Only outgoing air 18 from the container is allowed to exit from the bottom cap 14 of the breather 11. This outgoing air 18 exits when air pressure at the bottom cap 14 of the breather overcomes the spring or bias pressure of the check valves 37, e.g., air pressure at a container connected to the bottom cap 14 rises to overcome bias of the check valves 37. The check valve 37 does not allow any air to enter breather 11 through the check valves 37.

There are many styles, types and cracking pressure ratings for check valves, such as, for example, those which may be suitable as the check valves 27 and 37. As examples, these can include ball type, poppet style, piston type, bladder type, umbrella type, swing check, diaphragm type, and disc type check valves, as well as others now known or in the future becoming known. One particular example of the type of the check valves 27 and 37 of the breather is a spring loaded poppet type check valve made from plastic with an external o-ring seal to provide air tight seal on the outside diameter of the check valve, between the check valves and check valve housing (e.g., the respective caps 12, 14 of the breather 11). Such type of check valve is obtainable, for example, from Watts Ocean, IO-Series, Model No. IO-025. Although check valve cracking pressures are usually low, for example, about 0.1 psi or less, the check valves 27 and 37 are not limited to these low pressures and, depending on the application and pressure ranges for the breather 11 applications, cracking pressures can range upwards to even very high pressures as applicable.

In operation of the breather 11, the breather 11 is connected to a vessel or container (not shown in FIG. 2, but shown in FIG. 1) via the port 5 of the breather 11. As pressure in the container lessens sufficient to overcome the spring or other closed bias of the check valves 27 (i.e., in comparison to air pressure external to the breather 11 and container), air 19 enters the breather 11 through the check valves 27 of the top cap 12. Once the air 19 enters the breather 11 through the check valves 27, the air 19 passes through the filter media, for example, the silicon gel 8, of the filter holder 3 and to the bottom cap 14 and out the port 6 to the container, reaching an equilibrium pressure state between the container and breather 11 and the external air. On the other hand, as pressure in the container increases sufficient to overcome the spring or other closed bias of the check valves 37 (i.e., in comparison to a desired internal pressure of the breather 11 and container), air 18 escapes the breather 11 through the check valves 37 of the bottom cap. The air escaping the breather 11 through the check valves 37 does not pass back through the filter media, because the check valves 37 are located in the bottom cap 14 near the container (i.e., and the filter media resists the passage of the air where the less resistive escape route is through the then-opened check valves 37).

The check valves 27 and 37 in the top cap 12 and bottom cap 14, respectively, therefore, isolate the silica gel 8 (or other filter media) from both external/ambient air 19 outside the breather 11 housing and container air of any container connected to the breather 11 (i.e., once that container air has previously passed through the silica gel 8 into the container), and also route exhaust (or exiting) air 18 that is container air from the container through the bottom cap 14 and away from the breather 11 and silica gel 8, or other filter media, rather than such container air passing back through the filter media. The check valves significantly increase the life of a breather, as well as whatever type of filter media is employed with the breather (e.g., silica, molecular sieve, paper, cellulose, activated carbon, fibers, or others). The improvement in life of the breather can be especially dramatic when the filter media is silica gel or molecular sieve. Silica gel and molecular sieve each absorb moisture or other liquids/vapors from the air, and have a limited loading capacity for absorption; thus, the life span or cycle of these breathers has previously been limited for effective absorption of such moisture, particularly because external/ambient air and container air contacts and must pass through the filter media of the breather. The check valves 27, 37 of the breather 11, on the other hand, prevent contact of the external/ambient air and container air with the silica gel 8 or other filter media of the breather when air is not entering or exiting the breather 11 to accommodate a container or vessel pressure, and also eliminates passage of exiting container air back through the breather 11 in each instance of exhausting from the container. Thus, the breather 11 and check valves 27, 37 extend the life span of the breather 11 and its filter media.

Figures 3, 4:
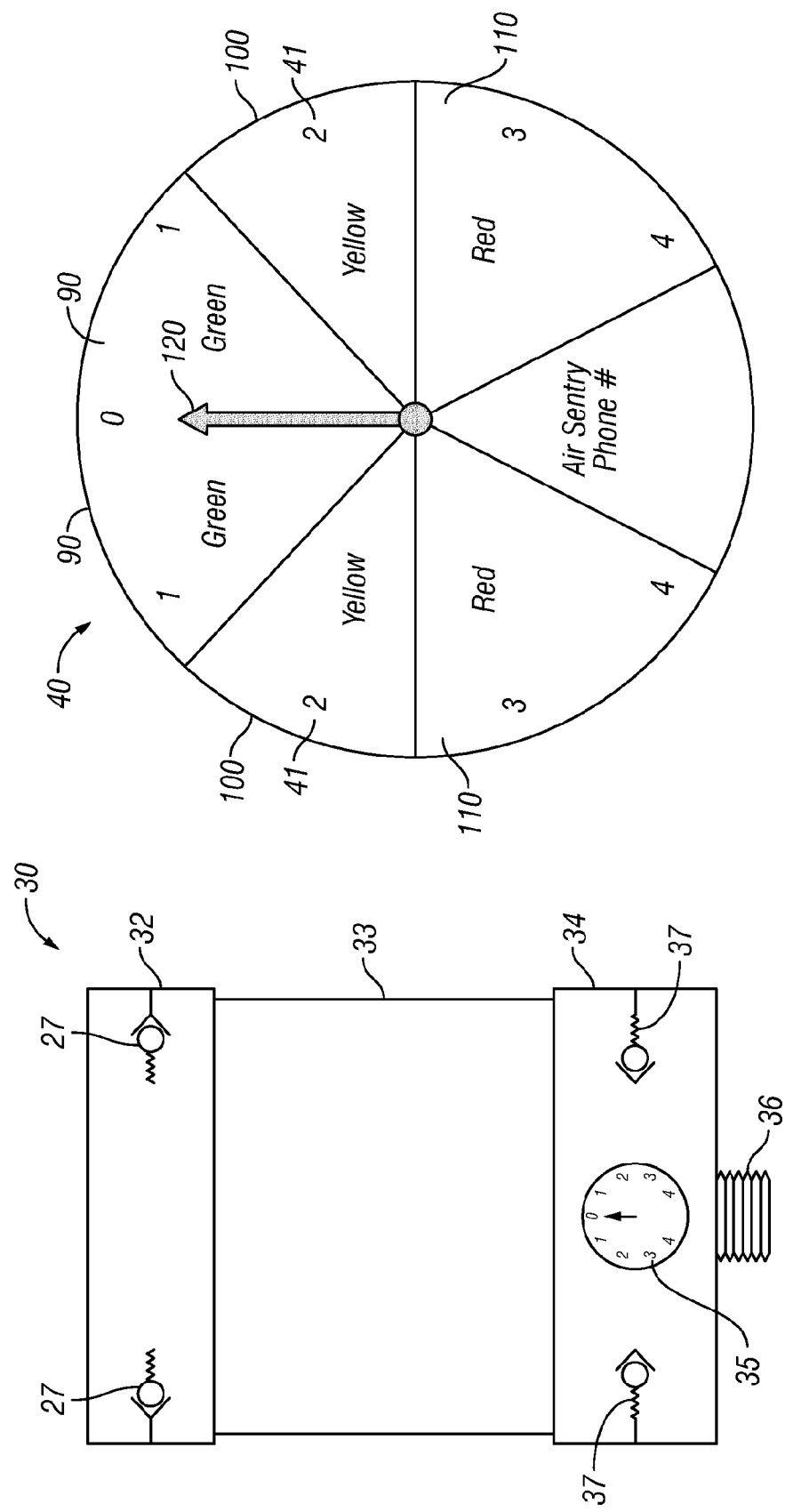
FIG. 3 illustrates a frontal side view of a breather having an incorporated compound pressure gauge, according to certain embodiments of the invention.
FIG. 4 illustrates a frontal side view of a gauge face of a compound pressure gauge, for example, that of the gauge of the breather of FIG. 3, according to certain embodiments of the invention.

Referring now to FIG. 3, another breather 30 according to certain embodiments includes a top cap 32, a filter holder 33 connected to the top cap 32, a bottom cap 34 connected to the filter holder 33, and a port 36 connected to the bottom cap 34. The port 36 is connectable or connected, for example, to a tank, reservoir, container or other vessel (not shown in FIG. 3, but shown for reference in FIG. 1). The breather 30 also includes a pressure gauge 35 connected to the bottom cap 32. The pressure gauge 35 is, for example, incorporated in, or attached (directly or indirectly), connected, mounted, or formed integral to, the bottom cap 34. The breather 30 additionally, but need not necessarily, includes inlet check valves 27 of the top cap 32 and outlet check valves 37 of the bottom cap 34.

According to certain variations, the gauge 35 can alternately be incorporated in, or attached (directly or indirectly), connected, mounted, or formed integral to, the top cap 32. Design choice of placement or location of the gauge 35 in the breather 30 will depend, for example, on the particular construction of the breather 30 and where air enters and leaves the breather 30. In any event, the gauge 35 is generally placed in the most efficient location of the breather 30 that will produce the most accurate measurement of air pressure in the breather 30. In certain alternatives, however, the gauge can be mounted anywhere in, on or adjacently connected to breather 31.

If the breather 30 includes the check valves 27, 37 in the particular embodiment, the pressure gauge 35 may be located in the same plane in the breather 30 as formed by the check valves 37. In certain alternatives, the breather includes one or more of the check valves 37 and/or one or more of the check valves 27. In certain examples, the breather includes of the four check valves 37, each located in the breather in the same plane around a circumferential perimeter of the bottom cap, positioned at 90° intervals of the circumferential perimeter. Similar or other arrangements of check valves, both the check valves 27 and the check valves 37, are possible in the embodiments.

The pressure gauge 35 provides both positive (over-pressure) and negative (under-pressure or suction) pressure determination with a singular device, for example, the pressure gauge 35 is what is known as a compound gauge. Such a compound gauge is, for example, a visual or readable mechanical or electrical device that monitors and indicates both over and under pressure conditions (i.e., excess pressure and negative pressure or vacuum conditions) as compared to a standard desired pressure point.

In operation, the pressure gauge 35 detects air pressure within the breather 30 in vicinity of the gauge 35. The pressure detected is indicative of pressure of any container connected to the breather 30. As air pressure within the breather 30 fluctuates, for example, when the container is filled or drained of contents or when other conditions (e.g., temperature, etc.) vary, the pressure gauge 35 detects the instant pressure and affords visual or other readable monitor of pressure from time to time.

The pressure gauge 35 provides significant accuracy of pressure readings at the breather 31, because the gauge 35 is either integral to or closely connected with the breather 31. This also reduces pressure drop that could occur over longer distance readings of gauges. Moreover, faster and more accurate indications of the pressure conditions being monitored are possible with the gauge 35. The gauge 35, furthermore, reduces expense of remotely mounting any separate pressure gauge, because the gauge 35 is mounted with (and/or as part of) the breather 30 and no additional mounting for gauges is needed.

Referring to FIG. 4, the gauge 35 of FIG. 3 includes a gauge face 40. The gauge face 40 provides visual or other readable indication of pressure measured by the gauge 35. As one possible example, but not intended as limited to such, the gauge face 40 is a visual type gauge (bourdon tube, diaphragm or other type) having a numbered scale 41 of the gauge face 40. The gauge face 40 of the example includes a moving needle 120 that pointingly indicates the pressure condition of the breather 30 then measured, in pressure and vacuum conditions. The numbered scale 41 is, for example, a measurement range (e.g., +1 to +4 psi and −1 to −4 psi) that is selectively chosen for measurement of the particular air through the particular breather and filter media in each case.

The gauge face 40 may additionally or alternately include color codes and text words. The color codes and words simplify and allow easy and immediate measurement and interpretation of the gauge face 40 for determining the gauge 35 pressure measures. An example color code and text word configuration is green, meaning all is good with the pressure at the breather 31 and there are no over or under pressure concerns; yellow, meaning caution or beware as an impending problem may exist or could arise; and red, meaning danger or a more immediate pressure condition or problem. These color code sections and text of the gauge face 40 indicate visually and immediately the condition of pressures being monitored inside the breather 31. As examples, the Green sections 90 indicate all is good with green color from minus 1 psi to plus 1 psi range, the Yellow sections 100 indicate that caution should be used and observed at the −1 to −2 psi scale and +1 to +2 psi scale, and the Red section 110 indicates possible danger if conditions are not immediately determined and remedied at the −2 to −4 psi and +2 to +4 psi ranges.

The gauge face 40, as well as the color codes and words, are intended only as exemplary, and any of a wide variety of other designs, configurations, visual, audible, machine read, or other variations are possible for the gauge 35. Also the example type of the gauge 35 is intended only as exemplary, and a variety of other types and styles of measuring devices are possible in addition to or in lieu of a visual type gauge with a compound scale (pressure and vacuum). The gauge 35 can alternately, or in addition to having the gauge face 40 can be, machine readable, for example, the gauge face 40 may be or include an electronic device (not shown in FIG. 4) providing electrical signals representing measurements detected by the gauge 35. Such electronic device as the gauge face 40 may include electrical sensors, components and other equipment, and may communicatively connect to remote location from the breather to indicate an alert to an operator as to pressure of the breather. According to other embodiments, remote mounting of the gauge 35 is possible. Remote mounting of gauge 35, however, requires additional parts, such as adapters, fixtures, connectors, and the like (not shown in FIG. 4), and may not be as accurate as measuring at or inside the breather 31.

FIG. 5 shows cartridge section 100 of a desiccant breather that is modular and accordingly parts of it can be reused. Cartridge 100 is the filtration part of the filter/breather. It is where the air will be filtered, humidity removed, oil mist removed or generally where the condition of the air will be improved. When cartridge 100 has expired or can no longer improve the air passing through it, this section of the breather can be removed and replaced at a lesser cost than the whole breather, which also reduces waste.

Also modularity results in a variety of assembly options, to configure a desired breather assembly (i.e. modular assembly allows many different breathers to be made from a selection of different top caps, cartridges, bottom caps and accessories). With a modular assembly as shown in FIG. 5, when a filter is plugged or used up and requires replacement, only the cartridge requires changing, which reduces waste and replacement cost. This customizable system of manufacturing has never been used, offered or promoted before and provides many unique features to reduce manufacturing costs, sales and replacement costs, environmental waste and also customer or application specific products.

Referring to FIG. 5, a cartridge assembly 50 for a breather (not shown in detail, but such as may be included in the breather 11, 30, 40 or other breather), includes a cartridge 100. The cartridge 100 is formed of or contains a filter media

110. The filter medium 110 can be, for example, any of a number of types of filters or media (e.g. including silica gel, activated carbon, synthetic filters, paper, clay, earth, earlike materials or others). The cartridge 100 has a cylindrical shape, for example, although shape may vary as required for the particular breather and its housing configuration.

The cartridge assembly 50 also includes threads 20 connected to the cartridge 100 (for example, at top and bottom extents in the view of FIG. 5), for securing the cartridge 100 formed of or containing the media 110 to a top cap and bottom cap (or other housing or enclosure, or portion thereof) of a breather. The threads 20 retain the cartridge 100 with the breather (such as via a filter holder of the breather) and keep the entire cartridge assembly 50 together and working together. Although the threads 20 in FIG. 5 are illustrated as mechanical type course threads, any other alternative type of thread or mechanical securement means or fixture for holding together the cartridge assembly 50 is also possible and included in embodiments.

In addition, to provide an airtight seal with a housing of a breather (for example, with a bottom and top cap), the cartridge assembly 50 can, but need not necessarily, further include o-ring seals 30 connected to the cartridge 100 and the threads 20. The o-ring seals 30 are positioned adjacent the threads 20 (or other securement means) to prevent air leaks when the cartridge assembly 50 is connected to a breather having mating threads (or mating securement means). The o-ring seals 30, in conjunction with the threads 20, seal the cartridge assembly 50 to a housing of the breather.

Finally, the cartridge assembly includes a cartridge housing 40 connected to the threads 20. The cartridge housing 40 is an enclosure (or partial enclosure) body for containing the cartridge 110. For example, the cartridge housing 40 is (or takes place of) the filter holder 3 or 33 of the embodiments of FIG. 2 or 3, respectively.

In operation of the cartridge assembly 50, the cartridge 100 is or is pre-loaded with the filter media 110 (such as by a manufacturer/supplier of the cartridge assembly). The cartridge assembly 50 is connected, via the threads 20, to the housing or portions of the housing (such as top and bottom caps) of a breather. The cartridge assembly 50 is sealed to the housing of the breather by the o-rings 30. The cartridge 100, via placement of the cartridge assembly, is thereby contained within the cartridge housing 40.

Referring to FIG. 6, an alternative cartridge assembly 600 allows for disassembly and re-assembly. In the embodiment, a cartridge housing 40 may be reused, so that the only part of the breather that is replaced is a filter media 210 contained in the cartridge housing 40. This affords flexibility to open/disassemble all or portions of the cartridge assembly 600 and to replace only portions that renew the filter media 210 or that otherwise prolong the useful life span of respective elements of the assembly 600. Consequently, environmental wastes, as well as servicing costs, are reduced. The cartridge assembly 600 has at least one serviceable area allowing filter media 210 materials to be accessed, removed and then replaced, in order for the assembly 600 to return to a useable condition. The cartridge assembly 600 can be manufactured to include or accommodate a disposable type cartridge that is thrown away and disposed of when used up, or the cartridge can be otherwise manufactured, such as with serviceable openings that allow reuse of the cartridge assembly 600 parts.

The cartridge assembly 600 includes plugs 50. The plugs 50 retain the filter media 210 inside of the assembly 600. With this modular cartridge structure, the assembly 600 can be opened and just the filter media 210 replaced, for example. The plugs 50 are retained by mechanical threads 60 of the plugs 50 (although this attachment means could also be a mechanical snap fit, glue fit, weld or any other means that would hold the assembly 260 together).

The plugs 50 removably connect to respective extents of a cartridge housing 40 containing the filter media 210. The cartridge housing 40 includes inner threads 60 and outer threads 70 at extents. The inner threads 60, respectively, mate with the mechanical threads 60 of the respective plugs 50, when joined in the assembly 600. The outer threads 70 respectively mate with a housing (or portions of a housing) of a breather, for example, a top cap and bottom cap, respectively, of the housing of the breather.

The filter media 210 is, for example, a cartridge 200 of the filter media 210 removably located in the cartridge housing 40. Alternately, the cartridge 200 is loose or filled filter media 210, such as may be poured or placed in the cartridge housing 40.

Each of the plugs 50 and the cartridge housing 40 include one or more O-rings 30. For example, the plugs 50 each respectively include an O-ring 30 adjacent an extent of the mechanical threads 60. The cartridge housing 40 externally includes upper and lower O-rings 30 adjacent extents of the respective outer threads 70.

As can be understood from the foregoing, the plugs 50 mate with respective extents of the cartridge housing 40, via the mechanical threads 60 and mating threads 60, and the outer threads 70 mate with a housing (or portion of a housing) of a breather, such as a top cap and bottom cap, in use. The O-rings 30 thereby seal surfaces of the plugs 50 and the cartridge housing 40, and of the assembly 600 and the breather, to ensure an air tight fit and thus better filtration. Embodiments with sealing provide superior performance in directing air flow through the filter cartridge assembly, therefore, seals and the like are helpful to prevent air from leakage. Such sealing (although optional in certain embodiments) provides better seal to the cartridge, via o-rings between all cartridge valve surfaces and mating surfaces. In the particular illustrated embodiment, a total of four o-rings (two on the inner surfaces and two on the outer surfaces) is effective. Although the assembly 600 with seals can be manufactured with a singular serviceable end in order to reduce manufacturing costs, it may be beneficial in certain applications to provide serviceable entry to the cartridge assembly 600 from both ends of the assembly 600, as has been described.

The seals in the foregoing embodiments can vary widely by design and material, and considerations of material availability and cost vs. return on performance can impact design and material choice. In certain embodiments, the assembly 600 need not include o-rings or similar seal, however, the same benefits of sealing may not be obtained. In other alternatives, the assembly 600 is sealed, for example, with various other type and materials of seal, such as including glues, welds, tapes, epoxies, gaskets, and mechanical pressures.

Figure 7:
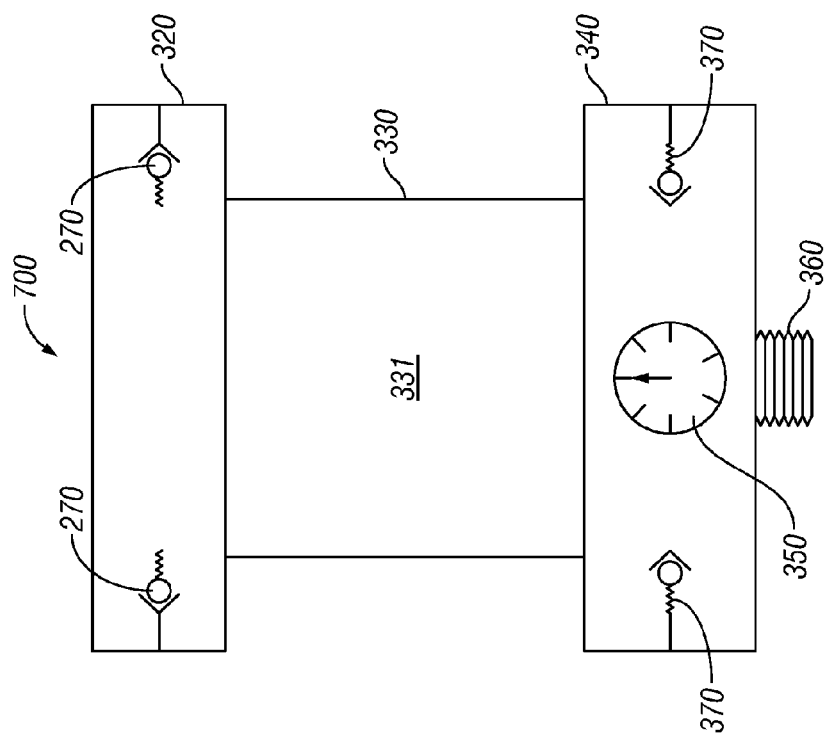
FIG. 7 illustrates a frontal side view of a breather including a modular cartridge filter, inlet and outlet check valves, and an incorporated pressure gauge, according to certain embodiments of the invention.

Referring to FIG. 7, a modular breather 700 according to certain embodiments includes a cartridge 330 of or containing a filter media 331. The breather 700 also includes a top cap 320 and a bottom cap 340 each connected to the cartridge 330. The bottom cap 340 is formed with or connected to a port 360. The modular breather 700 also includes inlet check valves 270 of the top cap 320 and outlet check valves 370 of the bottom cap 340, and the bottom cap 340 includes a pressure gauge 350. Although not expressly shown, the breather 700 can also include other devices, for example, diffusers or other filtration or particulate or moisture removal devices.

This modular configuration of the breather 700 allows for replacement of the cartridge 330, and thus the filter media 331 thereof, while retaining the top cap 320 and the bottom cap 340 for reuse. The top cap 320 and the bottom cap 340 contain devices and functionalities (i.e. check valve and pressure gauges) for the breather 700, therefore, reuse is desirable. Moreover, the top cap 320, bottom cap 340 and related devices can be expected to last longer than the life of cartridge 330 with the filter media 331 that has a limited life span.

In use, the modular breather is monitored for when to change the cartridge 330. This monitoring can be performed, for example, based on pressure changes of the breather as determined by the pressure gauge 350, time periods of use, or a color change of the filter media For example, the cartridge 330 may be transparent or present other indication or indicator of color or change for cartridge replacement.

Figure 8:
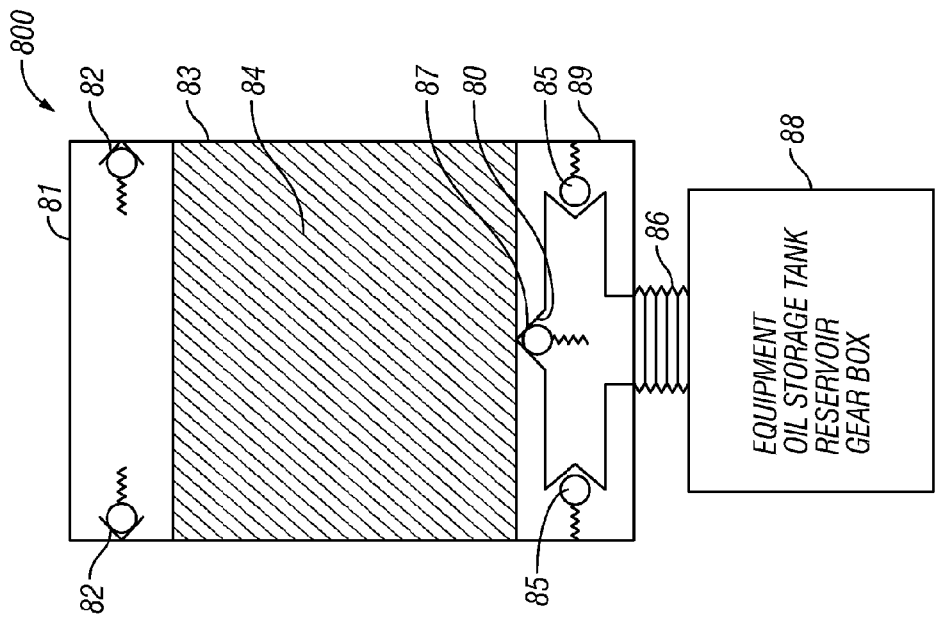
FIG. 8 illustrates a a frontal side view of a breather having inlet, outlet and intermediary check valves, connected to a vessel, according to certain embodiments of the invention.

Referring to FIG. 8, yet another breather 800 according to certain embodiments is connected to a container, reservoir, tank or other vessel 88. The breather 800 includes a filter holder 83 and a filter media 84, for example, a silica gel or molecular sieve or other media, contained in the filter holder 83. The breather 11 allows inlet and exiting air (or other gas) to and from the vessel 88 to selectively bypass and, once inlet and passed through the filter media 84, to not contact the filter media 84, as later described. The breather 11 further includes a top cap 81 and a bottom cap 89, each connected to the filter holder 83. The top cap 81 and bottom cap 89 can, but need not necessarily be according to application and requirements, sealed, for example, by o-rings or other seal mechanism, in connection to the filter holder 83.

The top cap 81 is formed or incorporated with, or connected to, one or more inlet check valve, for example, check valves 82 of the top cap 81. The bottom cap 89 is formed or incorporated with, or connected to, one or more outlet check valve, for example, check valves 85 of the bottom cap 89. In addition to the check valves 82 of the top cap 81 and the check valves 85 of the bottom cap 89, the bottom cap 89 is formed with an internal throughway 80 for flows of air to pass from the media to and through the bottom cap 89, as will be further detailed below with respect to FIGS. 9 and 10. The internal throughway 80 of the bottom cap 89 is formed or incorporated with, or connected to, one or more intermediary check valve 87.

The inlet check valves 82 of the top cap 81 are designed to prevent air (or other gas) from exiting through the top cap 81 but to allow such air (or gas) to selectively enter through the top cap 81 from external to the breather 800 to contact the filter media 84 and fill the vessel 88. The outlet check valves 85 are designed to prevent air from entering through the bottom cap 89 but to allow air (or gas) from the vessel 88 to selectively exit through the bottom cap 89 to external to the breather 800. The intermediary check valve 87 is designed to prevent air (or gas) from the vessel 88 and bottom cap 89 from contacting the filter media 84 (once such air has previously been inlet and passed through the filter media to the vessel 88) but to allow air (or gas) inlet to the breather 800 through the inlet check valves 82 to progress through the filter media 84 and through the internal throughway 80 to reach the vessel 88 for filling of the vessel 88 with the air (or gas).

Referring to FIG. 9, a breather 900 includes the elements of the breather 800 of FIG. 8. The vessel 88 contains a content 92 and an air space 90. In operation of the breather 900, the inlet check valves 82 only allow inlet air 91 to enter the breather 900 when a vacuum (i.e., lower pressure) state in the breather 900 overcomes a spring or operational pressure in the inlet check valves 82. The inlet check valves 82 do not allow air within the breather 900 to pass from the breather 900, and allow inlet air 91 to enter the breather 900 only if and when that air movement (due to lowered pressure in the vessel 88 and breather 900) is significant enough to overcome spring or other biasing pressure of the inlet check valves 82. Air pressure in air space 90 of the vessel 88 and in the breather 900 lower (i.e., increasing the volume of the air space 90), for example, on draining of the content 92 of the vessel 88 and/or when environmental or other physical parameters change (e.g., temperature lowers, etc.) for the content 92 or otherwise.

Continuing to refer to FIG. 9, in order for the inlet air 91 to reach the bottom cap 89 and vessel 88, the inlet air 91 must pass through the internal throughway 80 of the bottom cap 89. The internal throughway 80 of the bottom cap 89 includes the intermediary check valve 87. The intermediary check valve 87 only allows inlet air 91 entering the breather 900 and passing through the filter media 84 to pass to the bottom cap 89 and into the vessel 88. The intermediary check valve 87 prevents air of the air space 90 of the vessel 88 from again contacting or passing back through the filter media 84, once passed as inlet air 91 to the air space 90 through the intermediary check valve 87 and the internal throughway 80 to the vessel 88.

Referring to FIG. 10, a breather 1000 includes the elements of the breathers 800 and 900 of FIGS. 8 and 9. The vessel 88 contains the content 92. In operation of the breather 1000 for outlet of air (or other gas) from the vessel 88, the outlet check valves 85 of the bottom cap 89 of the breather 1000 only allow outlet air 94 to pass from the air space 90 of the vessel 88 when an excess pressure (i.e., higher pressure) state in the vessel 88 and bottom cap 89 overcomes a spring or operational pressure of the outlet check valves 85. The outlet check valves 85 do not allow air to enter the breather 1000 or vessel 88, and allow outlet air 94 to exit the vessel 88 and bottom cap 89 only if and when that air movement (due to increased pressure in the vessel 88) is significant enough to overcome spring or other biasing pressure of the outlet check valves 85. Air pressure in the vessel 88 and bottom cap 89 increases, for example, on filling of the content 92 of the vessel 88 and/or when environmental or other physical parameters change (e.g., temperature increases, etc.) for the content 92 or otherwise.

Continuing to refer to FIG. 10, the intermediary check valve 87 prevents air in the air space 90 of the vessel 88 and bottom cap 89 from contacting the filter media 84 (i.e., once having already passed through the filter media 84 as inlet air 91 and to the vessel 88). The intermediary check valve 87 also prevents outlet air 94 from passing back through the filter media 84 when excess pressure exists in the air space 90 of the vessel 88 and bottom cap 89. Thus, the intermediary check valve 87 prolongs the life of the filter media 84 (and, consequently, the breather 1000) by limiting contact of air (or gas) of the air space 90 with the filter media 84 and by preventing flow of outlet air 94 back through the filter media 84. Air that has entered the bottom cap 89 through the intermediary check valve 87 and internal throughway 80 cannot pass back through the breather 1000, and life of the breather 1000 is sustained for longer period leading to better economics, reduced labor, less waste and other benefits. Moreover, the intermediary check valve 87 prevents splash of vapors, fumes and droplets of air of the air space 90 and outlet air 94 on the filter media 84, and this is a significant benefit.

Numerous alternatives of the foregoing are possible in keeping with this disclosure. In certain alternatives, other types or varieties of seals or sealing means can additionally or in substitution be employed in the embodiments, including any of a wide number of different seal mechanisms (e.g. glue, adhesive, rubber, silicone, various types of sonic and vibratory welding, mechanical type holding, clamping or screwing mechanisms). Such seal mechanisms may be fixed or reversible to allow disconnection, however, reversible seal mechanisms may be particularly useful. Seals between the cartridge 110 and inlet and outlet sections of the housing 40 are also possible in the embodiments, and these can vary greatly from o-rings to gaskets made from hundreds of materials like rubber, buna rubber, viton, EPDM, silicone, and virtually any formable material that would comprise a seal. In certain alternatives, the cartridge 110 can be made of disposable materials (e.g. paper, wood, reusable plastic, 100% recyclable plastic, biodegradable materials and so forth); but it can also be made of some metals like aluminum, stainless steel and steel or other materials. The top caps and bottom caps can be made of similar or dissimilar materials as the cartridges. Other alternatives are also possible, including numbers, connection and placement of check valves, pressure gauge, and breather components may be varied. For breathers of different shape, variation of threading or other mating parts, seals, check valve and gauge placement, and others, is possible as required for the application. In general, breathers, and various parts and components, including housings, valves, gauges, threads, filter media, and seals can be segregated as unit pieces in different manner from that specifically described, or in different combinations or arrangements than described. Manufacture of the various parts and components may be dictated by type, style, or configuration, and manufacture can include both known extrusion, molding, machining, and other aspects, as well as specialized or proprietary manufacture techniques as may be particularly applicable for filter media and any parts or portions obtained from others. Of course, materials of the various parts and components can be varied, and manufacture of the parts and components can widely vary according to materials and design and economic choice.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A breather device for connection to a vessel containing a content, the breather device for inlet of air to the vessel and exit air from the vessel, the breather device comprising:
   (a) a filter holder having a top and a bottom;
   (b) a filter medium in the filter holder, the filter medium comprising a dessicant for passing the inlet air therethrough;
   (c) a cap connected to the top of the filter holder, the top cap having one or more inlet air check valves selectively biased to prevent air flow therethrough until the pressure in the vessel falls below a low pressure threshold;
   (d) a cap connected to the bottom of the filter holder, the bottom cap having one or more exit air outlet check valves selectively biased to open once the pressure in the vessel exceeds a high pressure threshold;
   (e) an air throughway in the bottom cap and connected to the bottom of the filter holder; and
   (f) a port coupled to or integral with the air throughway in the bottom cap for connecting the breather device to the vessel.

2. The breather device of claim 1, wherein the dessicant is silica gel, a molecular sieve, paper, cellulose, activated carbon or a fiber.

3. The breather device of claim 2, wherein the dessicant is silica gel.

4. The breather device of claim 1, wherein the top cap has one or two inlet air check valves and the bottom cap has one or two exit air outlet check valves.

5. A breather device for connection to a vessel containing a content, the breather device comprising:
   (a) a housing having a top and a bottom;
   (b) a filter media contained in the housing, the filter media comprising a dessicant for passing inlet air therethrough;
   (c) a cap connected to the top of the housing for entry of the inlet air into the breather device, the top cap having one or more inlet air check valves selectively biased to prevent air flow therethrough unless the pressure in the vessel falls below a low pressure threshold;
   (d) a cap connected to the bottom of the housing for removal of exhaust air from the vessel, the bottom cap having one or more exhaust air check valves selectively biased to prevent the exhaust air from entering the bottom cap until the pressure in the vessel exceeds a high pressure threshold;
   (e) an air throughway in the bottom cap connected to the bottom of the housing;
   a port coupled to or integral with the air throughway for connecting the breather device to the vessel; and
   (g) an intermediary check valve formed or incorporated with, or connected to the air throughway and selectively biased to prevent the exhaust air from contacting the filter media but allowing the flow of inlet air from the filter media to the vessel.

6. The breather device of claim 5, further comprising a pressure gauge incorporated in, or attached, connected, mounted or formed integrally to the bottom cap.

7. A modular breather device for connection to a vessel containing a content, the modular breather device for inlet of air into the vessel and for removal of exhaust air from the vessel, the modular breather device comprising:

(a) a top cap for entry of inlet air into the modular breather device, the top cap having one or more inlet air check valves selectively biased to prevent air flow therethrough until the pressure in the vessel falls below a low pressure threshold;

(b) a bottom cap for removing exhaust from the vessel, the bottom cap having one or more exhaust outlet check valves selectively biased to prevent the passage of the exhaust from the breather device until the pressure in the vessel exceeds a high pressure threshold;

(c) a cartridge assembly removably connected to the top cap and the bottom cap, the cartridge assembly containing a filter medium comprising a dessicant for passing inlet air therethrough;

(d) an intermediary check valve in the bottom cap and adjacent to the bottom of the cartridge assembly, the intermediary check value selectively biased to prevent the exhaust air from contacting the filter media in the cartridge assembly but to allow the inlet air to pass through the filter media and into the vessel;

(e) an internal throughway in the bottom cap formed with or incorporated in the intermediary check valve;

(f) at least one pressure gauge incorporated in, attached, connected, mounted or formed integrally to the bottom cap, top cap or both bottom and top caps; and (g) a port coupled to or integral with the bottom cap for connecting the breather device to the vessel.

8. A modular breather device for connection to a vessel containing a content, the modular breather device for passing air into the vessel, the modular breather device comprising:

(a) a breather housing having a top and a bottom;

(b) a cap connected to the top of the breather housing, the cap having one or more inlet air check valves selectively biased to prevent air flow therethrough until the pressure in the vessel falls below a low pressure threshold;

(c) a cap connected to the bottom of the breather housing, the bottom cap having one or more exhaust outlet check valves selectively biased to prevent passage of exhaust out of the breather device until the pressure in the vessel exceeds a high pressure threshold;

(d) a cartridge assembly removable from the breather housing and which is either (i) connected to or in the housing or (ii) connected to the top cap and bottom cap, the cartridge assembly comprising a cartridge housing, threads for securing the cartridge housing to the top cap, bottom cap or bottom top cap and bottom cap, and a replaceable filter medium in the cartridge housing for passing air therethrough from the one or more inlet air valves; and (e) a port coupled to or integral with the bottom cap for connecting the breather device to the vessel.

9. A breather device for removing particulates and/or moisture from air prior to the air contacting the content of a vessel, the breather device comprising:

(a) a housing having a top and bottom;

(b) a filter media contained in the housing, the filter media having a dessicant comprising paper, activated carbon, silica, wire mesh;

(c) a cap for the inlet of air into the breather device, the cap connected to the top of the housing and having one or more inlet air check valves selectively biased to prevent air flow through the one or more inlet air check valves until the vessel is at an under-pressure threshold, and wherein air is incapable from exiting the breather device through the top cap;

(d) a cap for removing exhaust from the vessel content, the cap connected to the bottom of the housing and having one or more exhaust outlet check valves selectively biased to prevent the exhaust from exiting the breather device until the vessel is at an upper-pressure threshold and wherein the one or more exhaust outlet check valves prevents the exhaust from entering the bottom of the housing;

(e) a port coupled to or integral with the bottom cap for connecting the breather device to the vessel;

(f) an internal air throughway in the bottom cap extending from the bottom of the housing to the port;

(g) intermediary check valve formed or incorporated with, or connected to the internal air throughway and selectively biased to prevent exhaust from the vessel from contacting the filter media while allowing inlet air to flow through the filter media to the vessel; and (h) one or two pressure gauges incorporated in or attached, connected, mounted or formed integrally with the top cap, bottom cap or both top cap and bottom cap.

10. The breather device of claim 9, wherein the filter media comprises silica gel.

11. The breather device of claim 9, wherein the pressure gauge is incorporated in or attached, connected, mounted or formed integrally with the bottom cap.

12. The breather device of claim 10, wherein the pressure gauge is located in the same plane as the one or more exhaust outlet check valves.

13. The breather device of claim 9, wherein the one or two pressure gauges is a compound gauge.

14. A method of removing moisture and particulate contaminants from air fed into a vessel having content and removing exhaust from the vessel using the breather device of claim 1, the method comprising:

(a) attaching the breather device to the vessel;

(b) opening the one or more inlet air check valves when the pressure in the vessel falls below a threshold pressure while maintaining the one or more exit air outlet check valves in a closed position;

(c) passing the inlet air through the one or more inlet air check valves and into the filter medium in the filter holder;

(d) removing moisture and particulate contaminants from the inlet air in the filter medium to render treated air;

(e) passing the treated air into the bottom cap and into the vessel through the port via the air throughway;

(f) closing the one or more inlet air check valves when the pressure in the vessel is greater than a high pressure threshold and opening the one or more exit air outlet check valves; and (g) passing the exit air from the vessel into the bottom cap and removing the exit air from the breather device through the one or more exit air outlet check valves.

15. The method of claim 14, wherein the dessicant is silica gel.

16. The method of claim 14, wherein the content of the vessel is a liquid selected from the group consisting of oils, foods, greases, paints, drinks, fuels, glues and acids.

17. The method of claim 14, wherein the content of the vessel is oil.

18. The method of claim 14, wherein the content of the vessel is a dry good or product selected from the group consisting of powders, cements, flour, sugar, papers circuit boards, electrical enclosures and transformers.

19. The method of claim 14, further comprising measuring the positive internal pressure of the vessel with a pressure gauge attached to, incorporated in or connected to the bottom cap.

20. The method of claim 14, further comprising measuring the negative internal pressure of the vessel with a pressure gauge attached to, incorporated in or connected to the top cap or bottom cap.

21. A method of removing moisture and particulate contaminants from air fed into a vessel containing a content through the modular breather device of claim 8 and removing exhaust from the content, the method comprising:
  (a) attaching the modular breather device to the vessel;
  (b) opening the one or more inlet air check valves when the pressure in the vessel falls below a pressure threshold while maintaining the one or more exhaust outlet check valves in a closed position;
  (c) feeding the inlet air through the one or more inlet air check valves and into the breather housing;
  (d) removing moisture and/or particulate contaminants from the inlet air in the filter medium to render treated air;
  (e) passing the treated air from step (d) into the bottom cap and into the vessel through the port;
  (f) closing the one or more inlet air check valves when the pressure in the vessel is greater than a high pressure threshold and opening the one or more exhaust outlet check valves;
  (g) passing exhaust from the vessel contents into the bottom cap and removing the exhaust from the breather device;
  (h) detaching the modular breather device from the vessel once the replaceable filter media in the cartridge housing has been spent;
  (i) removing the cartridge assembly from the breather housing;
  (j) replacing the spent filter media in the cartridge assembly with fresh filter media;
  (k) re-attaching the breather housing with fresh filter media to the vessel; and
  (l) repeating steps (b) through (g).

* * * * *